United States Patent [19]
Glassmeyer

[11] 3,807,756
[45] Apr. 30, 1974

[54] TRAILER LANDING GEAR MOUNTING STRUCTURE

[75] Inventor: John J. Glassmeyer, Covington, Ky.

[73] Assignee: Pullman Incorporated, Chicago, Ill.

[22] Filed: Mar. 2, 1973

[21] Appl. No.: 337,482

[52] U.S. Cl. ............................ 280/150.5, 254/86 R
[51] Int. Cl. ............................................. B60s 9/08
[58] Field of Search........ 280/150.5, 475; 254/86 R, 254/86 H

[56] References Cited
UNITED STATES PATENTS

| | | | |
|---|---|---|---|
| 2,815,962 | 12/1957 | McKay............................ | 280/150.5 |
| 3,197,235 | 7/1965 | Chieger............................ | 280/150.5 |
| 3,526,414 | 9/1970 | Palen.............................. | 280/150.5 |

*Primary Examiner*—Leo Friaglia
*Attorney, Agent, or Firm*—Richard J. Myers

[57] ABSTRACT

In a highway trailer, a mounting assembly for attaching a pair of landing gears to the underside of the trailer crossmembers including a pair of laterally spaced landing gear support legs and a mounting bracket structure for each leg and a landing gear crossmember connecting each leg, each mounting bracket structure including a longitudinally extending blade in the form of a vertical plate and a skirt in the form of a vertically extending channel having its web mounted on the inside of each blade, each blade having upwardly tapered webs converging downwardly with the intermediate portion of downwardly converging flanges of the skirt, and a top horizontal longitudinal flange on each blade mounting the blade to a plurality of the vehicle crossmembers with each blade and skirt connecting with each respective leg, the landing gear crossmember including a transverse generally horizontal channel (or box) member with horizontal flanges and a gusset in the form of a vertically webbed flared channel member with the widened portion of the web being mounted on a respective leg and the reduced portion being mounted on the respective end portion of each crossmember channel.

10 Claims, 4 Drawing Figures

PATENTED APR 30 1974 3,807,756

3,807,756

TRAILER LANDING GEAR MOUNTING STRUCTURE

BACKGROUND OF THE INVENTION

1. Field of the Invention

This invention relates to highway trailer landing gear arrangements and in particular relates to the mounting structure for attaching of the landing gear to the underframe of the trailer.

2. Description of the Prior Art

It has heretofore been known to mount landing gears to the underside of the frame of a highway trailer, but in the past it has been the practice to employ transverse and/or longitudinal diagonal braces, usually made of pipe, tubing, channels or angle iron. This is shown, for instance, in U.S. Pat. No. 3,046,910. However, it is desirable to eliminate these individual braces by building sufficient bending strength into the mounting structure for attachment of the landing gears to the trailer underside to result in an improved strengthened product and one where cost saving may be afforded. A lighter weight trailer is also a desirable result. Further, since such braces may be eliminated the result is an improved tractor tire swing clearance which will allow mounting of the landing gear legs further forward on the trailer vehicle, thus improving trailer stability when standing on its landing gear legs in its uncoupled position from the tractor.

SUMMARY OF THE INVENTION

It is, therefore, a general object of this invention to provide for a highway trailer a landing gear mounting arrangement that includes a mounting blade and channel skirt structure for attachment of the landing gear legs to the underside crossmembers of the trailer and which further provides for a landing gear crossmember of the channel type that attaches to the landing gear legs in horizontal alignment with the blade and channel skirt structure. The excellent symmetry of this mounting arrangement permits roadside or curbside orientation without changing the landing gear location. Also, this mounting arrangement provides for a lighter weight vehicle and an improved tractor tire swing clearance to thus allow the landing gears to be located more forwardly of the trailer to provide for greater trailer stability when uncoupled from the tractor. The blade having its lower edges being tapered upwardly from a central location allows for more equal load distribution on all of the vehicle crossmembers. The landing gear-attaching crossmember provides for transverse strength and stability of the mounting assembly in being connected with the juncture of the blade and channel skirt arrangement attached to each landing gear leg.

These and other objects and advantages will become apparent from reference to the following description, appended claims and the attached drawings.

DESCRIPTION OF THE PREFERRED EMBODIMENT

Figure 1:
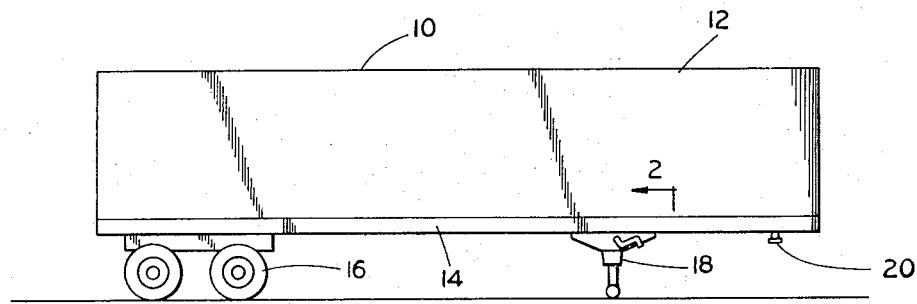
FIG. 1 is a side elevational view of a trailer.

With reference now to the drawings and in particular with reference to FIG. 1, there is shown a highway semi-trailer 10 provided with a cargo body 12 supported on a chassis 14 which is carried on a bogie 16 at its rear end and has at its forward end a landing gear arrangement 18 and at the very forward end of the trailer is provided a kingpin 20 for coupling of the forward end of the trailer to the rear of a tractor in a known and conventional manner. The landing gear arrangement 18 is raised and lowered by crank handle 11 which may be stored by a retainer hook 15 through a gear box 17 to operate cross shaft 13 for simultaneous movement of a pair of landing gears in a conventional manner.

Figure 2:
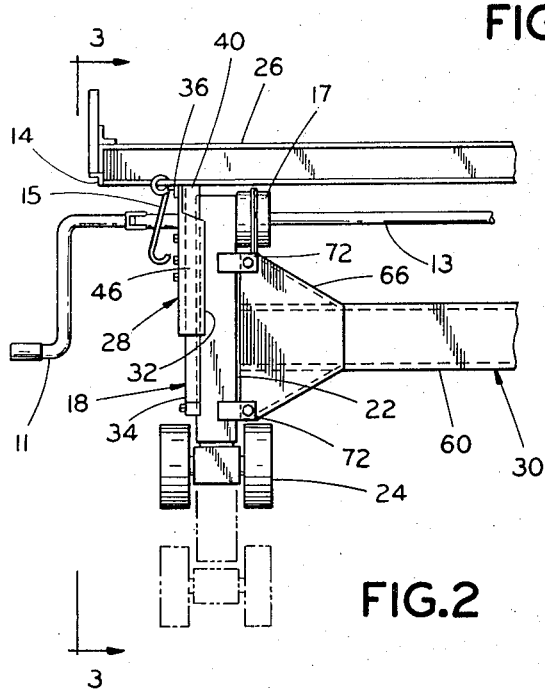
FIG. 2 is a sectional view taken along line 2—2 of FIG. 1.
Figure 3:
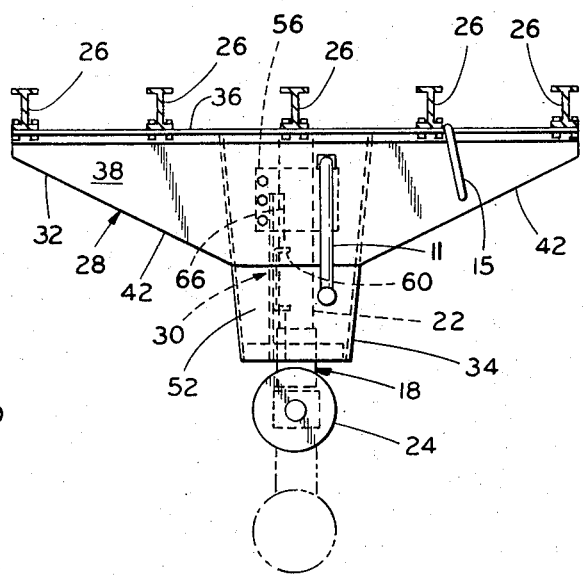
FIG. 3 is a view taken along line 3—3 of FIG. 2.
Figure 4:
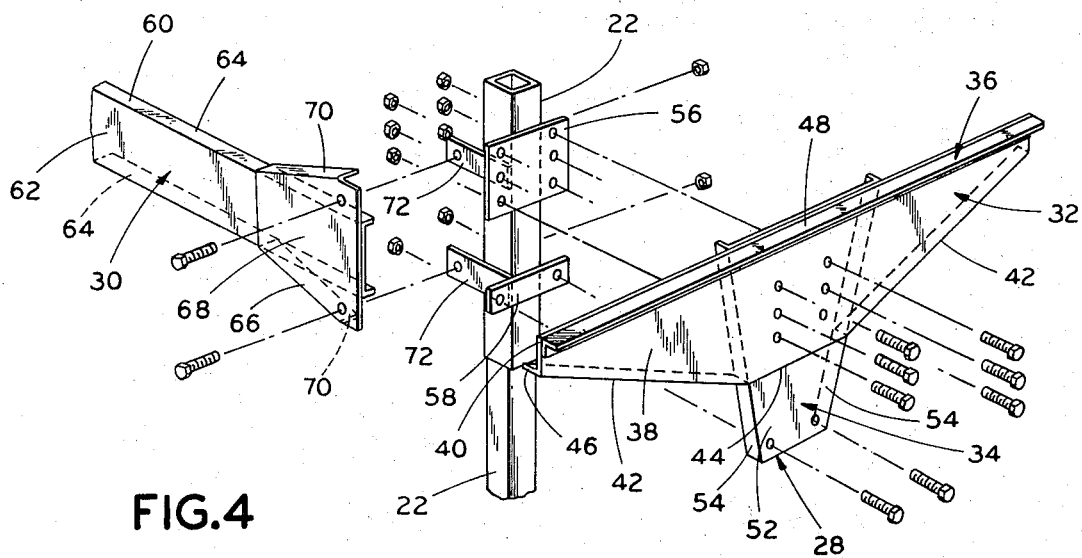
FIG. 4 is an exploded view of the landing gear mounting arrangement.

With reference now to FIGS. 2–4, it is seen that the landing gear arrangement 18 which is provided on each side of the trailer includes a landing gear leg 22 and landing gear wheels (or sand shoes) 24 which may be raised or lowered (shown in dotted line in FIGS. 2–3). Each of the two landing gear legs 22 is attached to the underside of the vehicle frame crossbearers or crossmembers 26 by means of a novel mounting arrangement which includes a mounting bracket structure 28 for each landing gear leg 22 and a landing gear crossmember 30 which is connected between each of the landing gear legs 22. The connection of the landing gear crossmember 30 to the landing gear leg 22 is generally in horizontal alignment with the connection of each mounting bracket structure or assembly 28 with the landing gear leg 22.

The mounting bracket assembly for each landing gear leg 22 comprises a blade member 32 and a channel skirt 34 and a mounting angle member 36. The blade 32 comprises a plate or web 38 which extends in a vertical plane and has downwardly sloping and converging outer edges 42, 42 and a central bottom horizontal edge 44, these edges 42, 42 and 44 being provided with a perpendicularly extending flange 46 of the same configuration or taper and the mounting angle member 36 is attached to the upper side of the horizontal top edge 40 of the web 38 and has vertical and horizontal flanges, the horizontal flange 48 thereof being attached to the underside of the I-beams crossmembers 26, as best seen in FIG. 3. Thus it is seen that the blade member 32 is provided with an angle member on its top connecting it to the crossmembers of the vehicle and has a bottom perpendicular flange with the blade web 38 having downwardly diagonally extending bottom surfaces 42, 42 connecting with the bottom horizontal part 44. The channel skirt 34 of the mounting bracket structure 28 includes a longitudinally extending flat vertical web 50 which is fixedly attached as by welding to the web 38 but has a lower portion 52 extending below the bottom edge 44 of the web 38. The web is also provided with downwardly tapering edges and with vertical flanges 54, 54 attached to its outer lateral edges as best seen in FIG. 4. The web 38 of the blade member 32 is apertured as is the upper part of the web 50 of the channel skirt 34 to receive bolt means for attaching of the blade member 32 and the channel skirt 34 to the apertured plate 56 mounted on the landing gear leg 22. Similarly, the bottom portion 52 of the web 50 of the channel skirt 34 is apertured to be mounted to aperture plate 58 on the landing gear leg 22. It will be noted that the sloped edges 42 of the blade member intersect and engage with the flanges 54 of the channel skirt 34 approximate midway the vertical extent of these flanges 54 and the web 50 of the channel skirt 34. This tapering of the blade to the skirt provides for more equal load distribution to each of the vehicle crossbearers 26.

The landing gear crossmember 30 includes a transversely extended elongated channel (or box) member 60 having a vertical web or webs 62 and horizontally extending flanges 64, 64. At each end of the landing gear crossmember 30 is provided a gusset or gussets 66 for attaching to a respective landing gear leg 22. Each gusset is also a channel member having a vertical web 68 and perpendicular flanges 70. The web 68 and the flanges 70 are flared outwardly toward a respective landing gear leg 22 as best seen in FIG. 4. The flared end portion of the gusset 66 has its web 62 apertured to couple by bolt means with the apertured brackets 72, 72 mounted on the landing gear leg 22. The flared gusset 66 is mounted on the landing gear leg so as to be in horizontal alignment with the lower edge 44 of a respective blade member web 38 so that the vertical edges of the gusset 66 are disposed somewhat equally on both sides of the edge 44 so as to direct loading from the skirt 34 and the blade 32 on one side of the vehicle to the other side. Such perfect symmetry of this mounting permits roadside or curbside orientation without changing the landing gear location. Also, this inventive design eliminates the need for individual braces by building sufficient bending strength into the mounting blade 32 to resist both fore-and-aft horizontal longitudinal forces and by the judicious placement of the crossmember 30 to resist transverse horizontal forces by itself.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a highway trailer, a landing gear mounting assembly for mounting a pair of landing gears to the trailer frame underside crossmembers comprising:
   a pair of landing gear support legs spaced apart laterally underneath the trailer,
   each leg having mounted thereto a mounting bracket structure including an upright channel skirt having a longitudinally extending web and a pair of edge flanges directed inwardly toward the other bracket structure,
   a longitudinally extending elongated generally triangular shaped blade in the form of a flat vertical plate carried on the outside of each web,
   said plate having at its lower tapering edges a pair of longitudinally spaced-apart flanges directed inwardly toward the opposite plate and terminating at the flanges of the channel skirt intermediate the vertical ends of the skirt,
   an angle member having a laterally outwardly directed horizontal and longitudinally extending flange being bolted to the underside of the vehicle frame crossmembers and having a vertical flange attached to the upper part of the blade,
   apertured plates on each support leg and aperture on each blade receiving bolt means for attachment of each blade to the respective leg,
   a landing gear crossmember being in general alignment with portions of the blade and skirt on each side of joining portions of the bottom of the blade and medial portions of the skirt,
   said landing gear crossmember being a channel member or box having a vertical web and upper and lower horizontal flanges and a gusset mounted on each end of the landing gear crossmember,
   each gusset including a vertical web having upper and lower edges diverging outwardly to a respective leg and carrying upper and lower strengthening flanges abuttable with a respective leg and attachment means on the faces of the vertical gusset web and on the leg attachment of each landing gear crossmember to each landing gear leg.

2. In a highway trailer, a mounting assembly for attaching a pair of landing gears to the underside of the trailer crossmembers including:
   a pair of laterally spaced landing gear support legs and a mounting bracket structure for each leg and a landing gear crossmember connecting each leg, each mounting bracket structure including a longitudinally extending blade in the form of a vertical plate and a skirt in the form of a vertically extending channel having its web mounted on the inside of each blade,
   each blade having upwardly tapered webs converging downwardly with the intermediate portion of downwardly converging flanges of the skirt, and a top horizontal longitudinal flange on each blade mounting the blade to a plurality of the vehicle crossmembers with each blade and skirt connecting with each respective leg,
   the landing gear crossmember including a transverse generally horizontal member with horizontal flanges and a gusset in the form of vertically webbed flared channel members with the widened portion of the webs being mounted on a respective leg and the reduced portion being mounted on the respective end portion of each crossmember channel member.

3. In a highway trailer, a mounting assembly for attaching a pair of landing gears to the underside of the trailer crossmembers including:
   a pair of laterally spaced landing gear support legs and a mounting bracket structure for each leg and a landing gear crossmember connecting each leg, each mounting bracket structure including a longitudinally extending blade in the form of a vertical plate and a skirt in the form of a vertically extending channel, each blade and skirt connecting with each respective leg,
   the landing gear crossmember including a transverse generally horizontal member and a gusset at each end of the landing gear crossmember being mounted on a respective leg.

4. The invention according to claim 3, and said skirt channel having a longitudinally extending and downwardly tapered web and flanges extending along the vertical edges of the web and directed inwardly of the trailer.

5. The invention according to claim 3, and said blade plate having lower edges being directed longitudinally outward and having inwardly directed flanges forming a gusset structural member to provide for equal loading of each of the trailer crossmembers.

6. The invention according to claim 5, and
said blade plate having along its upper horizontally extending edge perpendicular and outwardly directed flange attaching to the crossmembers of the trailer underside.

7. The invention according to claim 3, and
said skirt channel having a longitudinally extending and downwardly tapered web and flanges extending along the vertical edges of the web and directed inwardly of the trailer,
said blade plate having lower edges being directed longitudinally outward and having inwardly directed flanges forming a gusset structural member to provide for equal loading of each of the trailer crossmembers.

8. The invention according to claim 3, and
said landing gear transverse horizontal member having a transversely vertically extending web and horizontal flanges and each gusset of said landing gear crossmember being flared divergingly outwardly toward a respective landing gear leg and having perpendicularly directed flanges at the upper and lower edges of said flared channel member.

9. The invention according to claim 3, and
each landing gear crossmember gusset being located on each landing gear leg adjacent the overlapping portions of the blade and skirt of the mounting structure for equal distribution of loads between each of the landing gears.

10. The invention according to claim 1, and
said transverse horizontal member being a channel member.

* * * * *